United States Patent [19]

Landis et al.

[11] Patent Number: 4,661,650
[45] Date of Patent: Apr. 28, 1987

[54] SOLAR CELL COATED WITH HIGH MOLECULAR WEIGHT POLYIMIDE

[75] Inventors: Abraham L. Landis, Northridge; Arthur B. Naselow, Marina del Rey, both of Calif.

[73] Assignee: Hughes Aircraft Company, Los Angeles, Calif.

[21] Appl. No.: 871,657

[22] Filed: Sep. 2, 1986

Related U.S. Application Data

[62] Division of Ser. No. 801,433, Nov. 25, 1985.

[51] Int. Cl.$^4$ ............................................. H01L 31/04
[52] U.S. Cl. ..................................................... 136/256
[58] Field of Search ......................................... 136/256

[56] References Cited

U.S. PATENT DOCUMENTS 4,592,925  6/1986  DuPont et al. .................. 427/74

Primary Examiner—Aaron Weisstuch
Attorney, Agent, or Firm—M. E. Lachman; A. W. Karambelas

[57] ABSTRACT

A solar cell having an active surface protected by a free-standing film, said film having the recurring repeating unit:

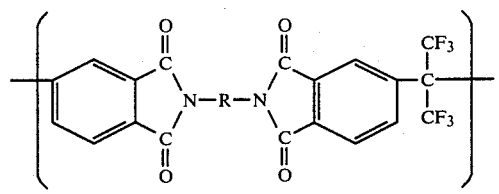

where R is:

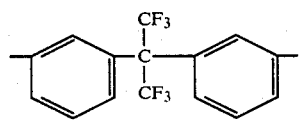

or

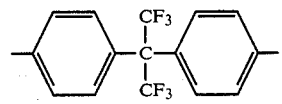

said film having a molecular weight of at least about 25,000.

3 Claims, No Drawings

SOLAR CELL COATED WITH HIGH MOLECULAR WEIGHT POLYIMIDE

This is a division of application Ser. No. 801,433, filed Nov. 25, 1985.

BACKGROUND OF THE INVENTION

1. Field of the Invention

The present invention relates to an improved process for preparing polyimides. More specifically, the present invention enables one to prepare polyimides of high molecular weight from dianhydrides and relatively unreactive diamines.

2. Description of the Background Art

Dupont and Bilow have disclosed polyimide composition coatings useful to encapsulate solar cells in their co-pending commonly-assigned, application Ser. No. 693,024 (now U.S. Pat. No. 4,592,925, issued June 3, 1986) and application Ser. No. 693,027, both filed Jan. 18, 1985 which are both divisional applications of Ser. No. 451,137 (now abandoned). These applications are expressly incorporated herein by reference.

The polyimide coatings of the above DuPont and Bilow patent application are formed from a polyimide composition which has the recurring structural unit shown below:

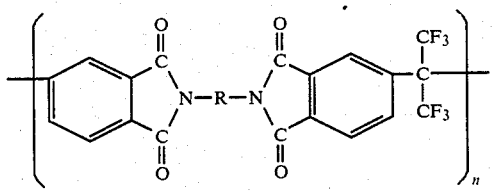

where R is:

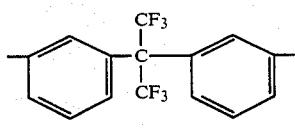

or

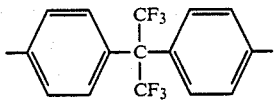

and n has a contemplated value range from 10 to about 2,000, preferably, from about 10 to about 1000.

The polyimide which is most preferred according to the DuPont and Bilow invention is the meta amino phenylene derivative of Formula II above, and having the recurring structural unit:

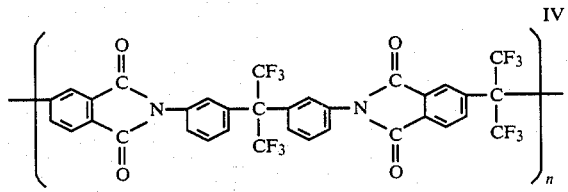

and its precursor has the polyamic acid structure:

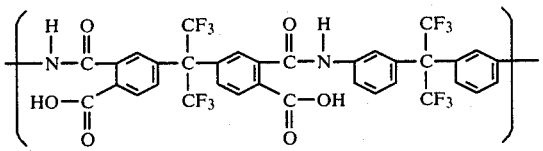

where n has the value noted above.

The polyimide of Formula I above has been prepared by the reaction of substantially equal molar proportions of the two monomers 2,2-bis(3- or 4-aminophenyl) hexafluoropropane and 4,4'-hexafluoroisopropylidene [bis(phthalic anhydride)], in a solvent for such monomers. The solvents which have been disclosed for use include, for example, dimethylsulfoxide, tetrahydrofuran, N-methyl pyrrolidinone, N-methylformamide, dimethylformamide and N,N-dimethylacetamide and mixtures thereof. The resulting polyamic acid solution has been cast as a film and the film imidized to the polyimide Structure I above. Both the polyamic acid and the polyimide have been characterized as having an inherent viscosity of at least 0.1, usually 0.3–0.5. The inherent viscosity of the polyimide is measured at 30° C. as a 0.5% solution in a suitable solvent, such as cold concentrated (95%) sulfuric acid or methanesulfonic acid.

In preparing the coated solar cells, a solution of the polyamic acid precursor of Formula V above in a solvent, such as tetrahydrofuran, at a concentration of about 10 to about 30% of the polyamic acid, has been used as a varnish for application to the active surface of a solar cell.

After application of the polyamic acid varnish to the solar cell, over a primer where desired, the solvent is essentially evaporated off and the amic acid polymer is converted into the imidized or polyimide structure of Formula IV by heating such amic acid polymer at about 250° C. Lower temperatures, such as at 120° C., can also be used to promote the imidization, but the reaction rate is slower and the elimination of solvent residues is slower. Preferred imidization temperatures range between about 160° C. and 250° C.

The DuPont and Bilow polyimide provides a coating which (1) is colorless, (2) is transparent to the solar radiation in the visible light spectrum, (3) is relatively non-brittle, (4) has a high degree of thermal stability, (5) readily transmits solar radiation without appreciable degradation, (6) is heat resistant, (7) does not degrade significantly when exposed to ultraviolet radiation, and (8) is highly effective in protecting against electrons and low energy proton radiation.

However, the DuPont and Bilow composition, due to its relatively low molecular weight as obtained, cannot be used as a manipulatable, free-standing film but must be applied in the form of a coating. While the DuPont and Bilow composition is satisfactory for its intended purpose, there exists in the art a need for such polyimide materials which can be provided in the form of a free-standing film or other useful form.

SUMMARY OF THE INVENTION

Therefore, it is an object of the present invention to provide high molecular weight polyimide polymers formed of a dianhydride and a relatively unreactive diamine. More specifically, an object of the present invention is to provide a polyimide formed by copolymerizing through polycondensation 2,2-bis(3- or 4- aminophenyl) hexafluoropropane (hereinafter "3- or 4-6F diamine") with 4,4'-hexafluoroisopropylidene[bis(phthalic anhydride)] (hereinafter "6FDA"), said polyimide being characterized by a molecular weight above that obtained by copolymerizing the same materials using prior art procedures. Another object of this invention is to provide a method for preparing said high molecular weight polyimide from 3- or 4-6F diamine and 6FDA.

A further object of this invention is to provide a free-standing film fabricatable into useful forms and formed of a polyimide of 3- or 4-6F diamine and 6FDA.

Still another object of this invention is to provide a solar cell comprising a free-standing film of a polyimide formed of 3- or 4-6F diamine and 6FDA as a thin sheet of clear radiation protection material.

Other objects of this invention will be apparent to the skilled artisan from the Detailed Description Of The Invention hereinafter.

In accordance with the present invention, a polyimide comprising the recurring structural unit shown below:

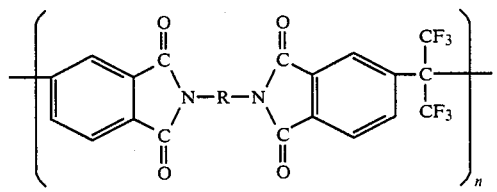

where R is:

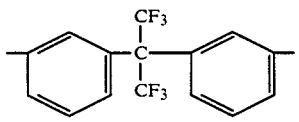

or

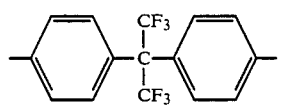

is prepared by reacting substantially equal molar proportions of the two monomers 3- or 4-6F diamine and 6FDA in a solvent, wherein the improvement comprises using a cresol as said solvent.

In a preferred embodiment of the present invention the diamine is 3-6F diamine.

In another preferred embodiment of the invention the solvent comprises meta-cresol.

Still another preferred embodiment of this invention involves preparing the high molecular weight 6-F diamine/6FDA polymer in the cresol solvent, followed by forming a free-standing, non-brittle, fabricatable film using a conventional solvent solution casting process. The film can be employed as a protective layer on the active surface of a solar cell.

DETAILED DESCRIPTION OF THE INVENTION

As described hereinabove, polyimides of the following structures are known:

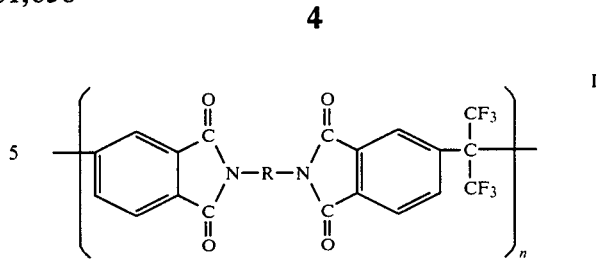

where R is:

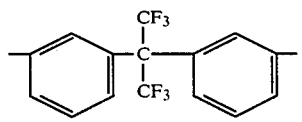

or

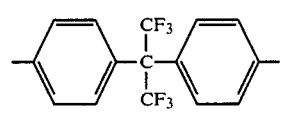

Also, it has been known to react the respective monomers 2,2-bis(3- or 4-aminophenyl)hexafluoropropane and 4,4'-hexafluoroisopropylidene[bis(phthalic anhydride)] in the presence of a solvent such as those enumerated hereinbefore, with the reactants being mixed at about room temperature. In practice, the initial product formed following the prior art is the polyamic acid precursor of the polyimide. The polyamic acid can be converted to the polyimide by solvent evaporation followed by heating at about 250° C.

In carrying out the polyimide preparation process embodiment of this invention, the respective monomers are reacted as heretofore with the substitution of a cresol as the solvent, and with the use of heat to aid dissolution and to form the polyimide.

Although not entirely understood, the use of a cresol solvent allows the polycondensation reaction to proceed beyond the point reached in practice with the employment of the solvents of DuPont and Bilow, bringing the polyimide molecular weight up to a level where a free-standing film which can be manufactured into useful forms is obtainable. Further, with the use of cresol solvent, the reaction in solution proceeds past the precursor polyamic acid stage to form an isolatable polyimide.

In an effort to understand the unique effect cresol exerts on the 6FDA/6F diamine polyimide reaction, it is believed that the following factors may be involved: (1) cresol is mildly acidic, which would extenuate the basicity of 6F diamine, (2) cresol has a high boiling point which facilitates the formation of the cyclic imide structure from the precursor amic acid, and (3) cresol is non-reactive with the polyimide at the elevated temperatures necessary to drive the reaction to completion. In the cresol solvent, first the polyamic acid is formed at a lower temperature (about ambient temperature). Upon heating to a higher temperature (up to 210°-220° C.), the polyamic acid cyclodehydrates to the polyimide. The polyimide is completely soluble in the cresol solvent.

The 6F diamine/6FDA polyimide of this invention is characterized by molecular weight of about 10,000 to 130,000, preferably about 25,000 to 50,000 ("n" of about 15 to 200, preferably about 40 to 80) and inherent viscosity of about 0.1 to 0.6, preferably about 0.4. Inherent viscosity is measured at 30° C. as a 0.5% solution in a suitable solvent such as N,N-dimethyl acetamide or tetrahydrofuran.

As used herein, the term "cresol" is inclusive of ortho-cresol, meta-cresol, para-cresol, or mixtures thereof. In the practice of the present invention, meta-cresol is preferred since it is the easiest of the cresol isomers to remove and it does not leave a residue which is potentially deleterious. For example, when para-cresol is oxidized, a colored material is produced which would be deleterious if the desired polyimide product needed to be colorless. However, commercial grade materials, which do contain impurities, are usable in the practice of this inven.tion. Commercial grade "cresol" is often a mixture of the three isomers plus impurities. It is preferable to dry and vacuum distill the commercial grade cresols to remove water and colored impurities.

Moreover, the cresol solvent used in practicing the present invention may be mixed with a co-solvent which does not adversely affect the preparation of high molecular weight polyimides and which has a boiling point that is compatible with the temperature needed to produce the reaction to form the polyimide product. Typical co-solvents include benzene, toluene, and xylene. In addition, the latter co-solvents could facilitate formation of the polymer product by allowing water to be removed from the reaction mixture by azeotropic distillation and thus preventing break-up of the polymer by water. The co-solvent may comprise up to 95% by volume of the reaction solvent, with the cresol component achieving the desired results in accordance with the present invention by a catalytic effect.

The polyimide can be isolated by admixing the cresol solution thereof with sufficient non-solvent, such as absolute methanol, or ethanol, or by driving off the cresol solvent by vacuum distillation. Thereafter, following further purification if desired, a film can be formed by a standard solvent film casting process, for example by dissolving the polymer in dimethylacetamide or a mixture of dimethylacetamide with acetone, followed by casting onto a stationary or moving warmed substrate and heating to remove remaining solvent. A recoverable, transparent film is obtained which can be used in the place of the quartz or glass covers of individual solar cells. One could bond the film to a solar cell using the polyimide in the form of a lacquer with solvents such as tetrahydrofuran, acetone, dimethylacetamide, and similar solvents or mixtures.

The following non-limiting example illustrates the preparation process of this invention.

EXAMPLE 1

A 100 ml, round bottom, three-necked flask was fitted with an oil bath, magnetic stirrer, reflux condenser, nitrogen gas inlet, and nitrogen gas outlet to a mercury bubbler. The flask was charged with 6FDA (4.44 grams, 0.010 mole) and freshly distilled and dried metacresol (35 ml). The 6FDA formed a light yellow solution and it was necessary to warm the metacresol to effect solution. The solution was cooled to room temperature and 3-6F Diamine (3.34 grams, 0.010 mole) was added portion by portion. The solution was stirred at ambient temperature for 30 minutes and then the oil bath placed under the flask. The reaction mixture was heated under nitrogen with the oil bath temperature at 210°–220° C. There was some frothing during the early part of heating, probably due to the evolution of water from the imidization step. The reaction mixture was heated for 1 hour, cooled to ambient temperature and the polymer isolated by pouring into 300 ml of absolute methanol. The polymer was filtered and washed with fresh methanol and dried at 90° C. in vacuum. The polymer was then dissolved in 200 ml of tetrahydrofuran, treated with several grams of activated charcoal, filtered and reduced in volume to 75 ml. Then 200 ml of absolute methanol was added and the precipitated polymer filtered. The polymer was washed with methanol and dried at 100° C. to yield 4.1 gms, molecular weight (Mw) of 34,400. After standing, additional polymer came out of solution, Mw of 13,800. A good quality colorless free-standing film was cast from the 34,400 Mw polymer by dissolving in dimethylacetamide, drying at 100° C. in a forced air oven and then up to 300° C. in nitrogen. The film when heated in air at 300° C. showed very little color change. It was also soluble in dimethylacetamide and acetone after the 300° C. heat treatment, which makes this material unique among polyimides. Such a film of thickness of about 0.1 to 2.0 mils ($2.54 \times 10^{-4}$ to $5.08 \times 10^{-3}$ cm) can be used to protect the active surfaces of solar cells.

Variations of the invention will be apparent to the skilled artisan. For example, it is contemplated that the high molecular weight polyimide of the present invention could be directly cast from a solution thereof onto a substrate such as a solar cell without first forming the free-standing film, and the polyimide film of the present invention could be used in other applications, such as in the printed circuit industry, including use as an alpha particle barrier in semiconductor device manufacture. In these applications, at times a free-standing film would be used and at other times a polymer solution would be applied, such as by dipping, electrocoating, spraying, electrostatic spraying and the like. The polyimide herein lends itself to various manufacturing techniques. Also, the unique solubility properties of the polyimide will suggest other uses, such as in preserving art objects, i.e. stained glass windows.

What is claimed is:

1. A solar cell having an active surface protected by a free-standing film, said film having the recurring repeating unit:

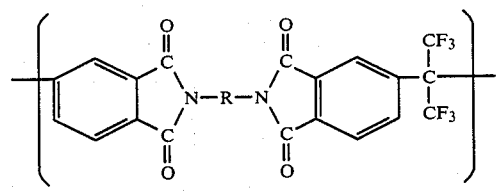

I where R is:

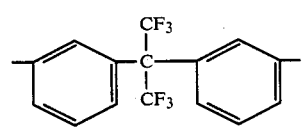

II or

-continued

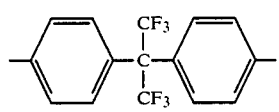

said film having a molecular weight of at least about 25,000.

2. A solar cell having an active surface protected by a free-standing film, said film being formed by:

(a) reacting substantially equal molar proportions of a first reactant which is 2,2-bis(3-aminophenyl)hexafluoropropane or 2,2-bis(4-aminophenyl) hexafluoropropane with a second reactant which is 4,4'-hexafluoroisopropylidene[bis(phthalic anhydride)] in a solvent for said reactants to prepare a polyimide having the recurring structural unit:

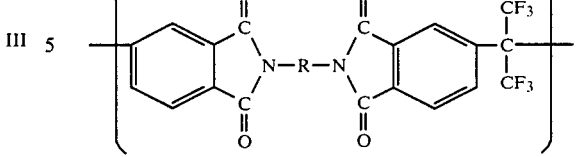

wherein R is:

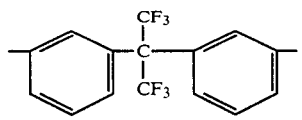

or

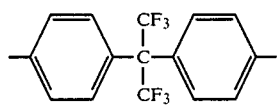

wherein said solvent comprises cresol, said polyimide being soluble in said solvent; and (b) isolating said polyimide from said solvent, dissolving said isolated polyimide in a casting solvent to form a solution, and casting said solution into a free-standing manipulatable film.

3. The solar cell of claim 2 wherein said free-standing film is bonded to said solar cell by a bonding composition comprising said polyimide set forth in claim 17.

* * * * *

UNITED STATES PATENT AND TRADEMARK OFFICE
CERTIFICATE OF CORRECTION

PATENT NO. : 4,661,650

DATED : April 28, 1987

INVENTOR(S) : ABRAHAM L. LANDIS and ARTHUR B. NASELOW

It is certified that error appears in the above—identified patent and that said Letters Patent is hereby corrected as shown below:

Claim 3, line 3, delete "17" and insert therefor --2--.

Signed and Sealed this

Twenty-second Day of September, 1987

*Attest:*

DONALD J. QUIGG

*Attesting Officer*     *Commissioner of Patents and Trademarks*